Robert P. Felgar Jr.
INVENTOR.

BY
ATTORNEY

Jan. 5, 1971   R. P. FELGAR, JR   3,552,178
METHOD OF PRESTRESSING PARTS SUBJECT TO THERMAL SHOCK
Filed Jan. 26, 1968   2 Sheets-Sheet 2

Robert P. Felgar Jr.
INVENTOR.

BY
ATTORNEY

# United States Patent Office 3,552,178
Patented Jan. 5, 1971

3,552,178
METHOD OF PRESTRESSING PARTS SUBJECT TO THERMAL SHOCK
Robert P. Felgar, Jr., Malibu, Calif., assignor to TRW Inc., Redondo Beach, Calif., a corporation of Ohio
Filed Jan. 26, 1968, Ser. No. 700,925
Int. Cl. B21d 31/00
U.S. Cl. 72—342
11 Claims

ABSTRACT OF THE DISCLOSURE

A method of prestressing refractory metals, ceramics and graphite including heating a surface of an article made from one of the refractory materials until it is hot enough to flow plastically, the heating being slow enough to avoid thermal shock; then applying a pressure to the article to cause the heated surface to flow plastically and be deformed, and cooling the surface, thereby providing residual stresses in the surface and residual stresses of opposite sign in the surface opposite the heated surface.

A prestressed article of manufacture made of a refractory material, the prestress having been applied in accordance with the above method.

BACKGROUND OF THE INVENTION

The invention relates to a means of prestressing refractory metals, ceramics and graphite which are to be subjected to high temperatures in the ranges of 4,000° F. to 6,500° F. very rapidly, such as in a fraction of a second or in a few seconds, and in which one surface of the material becomes very hot corresponding to the temperature to which it is subjected and an opposite surface of the material remains relatively cool, such as at room temperature. Many parts, such as rocket nozzle inserts, are subject to temperatures in the above range, these parts being made: from refractory metals, including tungsten, tantalum, rhenium and alloys thereof, such as tungsten-rhenium alloy; from ceramics, such as tantalum carbide, hafnium carbide, zirconium oxide, beryllium oxide; and from graphite.

These materials are usually brittle at relatively low temperatures and consequently, when they are subjected to a large temperature gradient, the cool portion of a part is stressed in tension and tends to crack before the entire part comes to a more uniform temperature. This condition is thermal shock. Transient thermal shock failure can be avoided if a prestressing method is used to induce compressive stresses in the region where the tensile thermal stresses occur.

In a rocket nozzle insert, generally having the configuration of a right cylindrical ring, during the thermal shock transient occurring for a short period, such as one second after ignition, tensile stresses are produced on the outside circumferential surface, the heat having been applied directly to the inside circumferential surface. These inserts are usually positioned in the rocket nozzle throat.

In the prior art, compressive stresses have been produced on the external circumferential surface of such inserts by prestressing the latter with a metal ring. The metal ring, as made, has an inside diameter less than the outside diameter of the nozzle insert and by cooling the insert and heating the metal ring, the ring can be slipped over the insert.

The principal disadvantage of prestressing by means of a metal ring is that after repeated firings of a rocket nozzle insert, the prestress decreases due to creep and/or plastic flow in the metal ring. Another disadvantage of this prior art method is that very close tolerances are required, not only in the radii of the two parts, but also in uniformity of the center along the axis of the metal ring.

The metal ring technique also has the disadvantage that the same interference fit is not maintained during the operating cycle due to unavoidable differential thermal expansion between the rings and the insert.

In the present invention, the foregoing disadvantages are eliminated in that the metal ring, an extra part, is not required, and the prestress is produced by residual stresses in the rocket nozzle insert itself, for example. The insert has a greater resistance to creep and plastic flow during the operating cycle than typical metal rings that have been used for prestressing. As is apparent, since the metal ring is eliminated, there is no tolerance problem and no problem of differential thermal expansion.

SUMMARY OF THE INVENTION

The invention is a method of prestressing refractory materials to prevent their failure when they are subjected to thermal shock. It further includes an article of manufacture made from a refractory material and which has been prestressed in accordance with the method.

An object of the invention is to provide an improved method for prestressing materials to be subjected to thermal shock.

Another object of the invention is to provide an improved article of manufacture which is prestressed so as to prevent failure thereof when subjected to thermal shock.

Still another object of the invention is to provide a method for prestressing refractory material by producing residual stresses in the material itself.

A further object of the invention is to provide a prestressed material, as described in the above paragraph, and which has a greater resistance to creep and plastic flow in operation than was possible in the prior art means and method for prestressing.

A still further object of the invention is to provide a method for prestressing, as described in the preceding paragraph, and in which the prior art requirement for close tolerances and problems of differential thermal expansion between a prestressing ring and a refractory material have been eliminated.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes.

DESCRIPTION OF THE PREFERRED EMBODIMENTS

Figure 1:
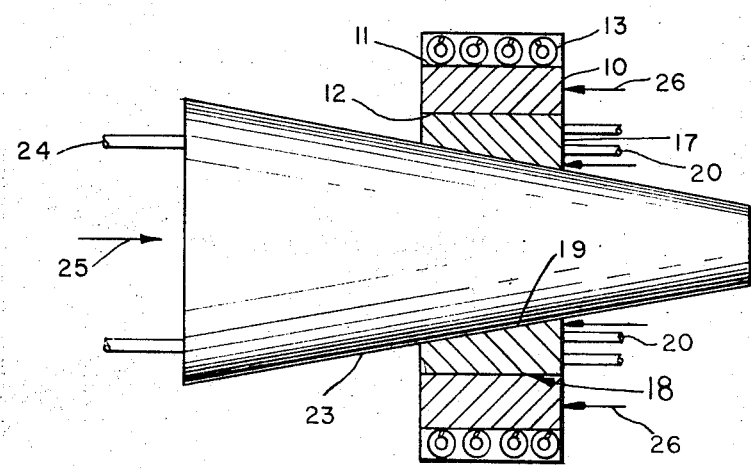
FIG. 1 is a diagrammatic cross-sectional view illustrating a method according to the invention of prestressing a rocket nozzle insert.

Referring again to the drawings, there is shown in FIG. 1 a right cylindrical ring 10 in position to be prestressed for use as a rocket engine nozzle insert. The ring may be made of tungsten-rhenium alloy, tantalum carbide, hafnium carbide, zirconium oxide, beryllium oxide, or graphite; all of which, for the purpose of the present invention, are considered to be refractory material. Such refractory materials are adapted to be subjected to temperatures in the range of 4,500° F. to 6,500° F. The ring 10 has an outer circumferential surface 11 and an inner circumferential surface 12. Surrounding the outer surface 11 is an induction heater 13 adapted to heat the outer surface until it becomes ductile and can be made to flow plastically. For tungsten and tungsten alloys, the outer surface should be heated in the range of from 2,500° F. to 3,000° F. at which such materials become ductile and which will flow at a predetermined stress so as to be plastically deformed. For tungsten, for example, it has been determined that the prestress pressure to be applied at the above temperatures is approximately 2,500 pounds per square inch.

Inwardly of the ring 10 is a ring 17 having an outer cylindrical surface 18 and an inner conical surface 19. The outer surface 18 is fitted in snug contact with the inner surface 12 of the ring 10. The ring 17 is adapted to be water cooled and has hoses 20 connected thereto to provide water circulation through the ring. The cooling of the ring 17 also serves to maintain a relatively low temperature adjacent the inner surface 12 of the ring 10.

Slidably engaged within the ring 17 is a conical-shaped tool or rod 23, having a conical surface complementary to that of the inner surface 19. The tool 23 is also adapted to be water cooled and has hoses 24 attached by which water is circulated within the tool to prevent it from being heated. The arrow 25 indicates the direction of force to be applied to the tool 23 and the arrows 26 on the right side of the drawing indicate the holding means to be applied to the inner and outer rings to prevent their movement.

A rocket engine nozzle insert, as the ring 10, is prestressed according to the invention by inducing residual stresses of opposite sign in the insert to those arising from temperature gradient occurring during the firing in the rocket engine. The residual stresses are produced by stressing the insert by means of the tool 23 after the outer circumferential surface of the ring 10 has been brought up to a temperature sufficient to permit it to flow plastically. In the process, since the outside of the ring 10 is substantially hotter than the inside, the outside flows plastically and creeps at a lower stress than the inside. If it is desired, plastic flow or deformation of the inside can be avoided by keeping its temperature down sufficiently.

The ring 10 is maintained in the stressed and heated condition until the required deformation has occurred at the outside circumferential surface. This is determined by using a mechanical extensometer, designed for high temperatures, on the outside surface. The total plastic deformation required for tungsten is about 0.004 inch/inch.

For tungsten, the deformation usually occurs after about 10 hours at 2,500 pounds per square inch of pressure. Upon release of the inside pressure and cooling to room temperature, the permanent tensile strains at the outside of the ring 10 produce compressive residual stresses on the outside and tensile residual stresses on the inside. This stress state reduces the danger of tensile stresses (of the opposite sign of the residual compressive stresses) of the outside occurring during operation. The creep strains for production of the residual stresses are induced by using sufficiently high temperature for a suitable time of application of internal pressure to preclude losing a significant portion of the prestress during operation.

Figure 2:
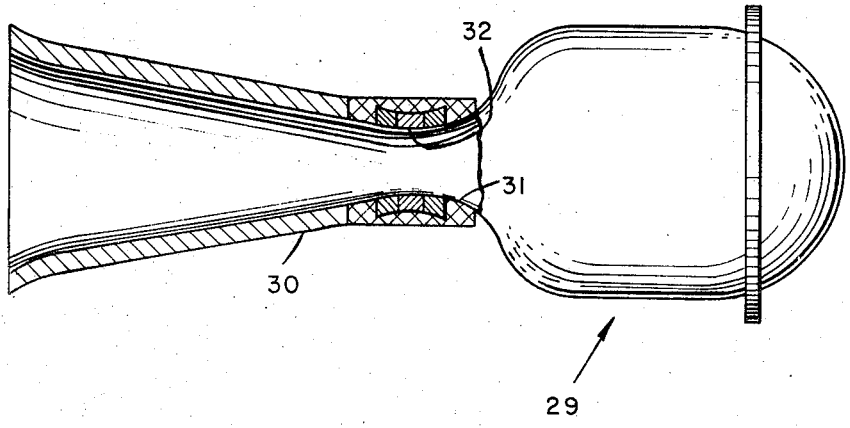
FIG. 2 is a partially cross-sectional view of a rocket engine having a nozzle insert of the type shown in FIG. 1.

In FIG. 2 there is shown a rocket engine 29 having a nozzle 30 and a throat 31 where the hottest temperature occurs during firing. For this reason the prestressed rings are inserted into the throat. The rocket engine here is shown with a ring 32 which may be, as ring 10, of tungsten-rhenium alloy and which has been prestressed as indicated in the foregoing. The remainder of the engine inner surface may be typically columbium, also a refractory material. Such prestressing, that is, having a compressive residual prestress in the outer surface of the ring 32 and tensile prestress along the inner surface, reduces the tensile stress produced at the outer surface during firing of the rocket engine by a factor of 2, and this prevents thermal shock failure during the engine firing where the temperature at the throat is in the range of between 4,500° F. and 6,500° F., the heat occuring in one second or less while the outer portion of the ring may still be close to room temperature.

Figure 3:
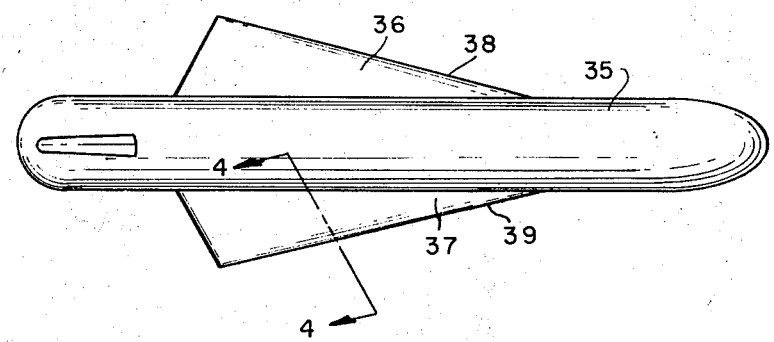
FIG. 3 is an elevational view of a reentry vehicle.
Figure 5:
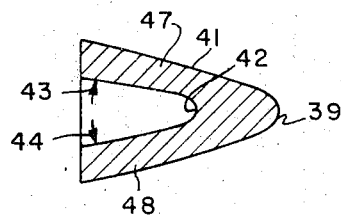
FIG. 5 is a cross-sectional view of the leading edge portion of the wing shown in FIG. 4.
Figure 4:
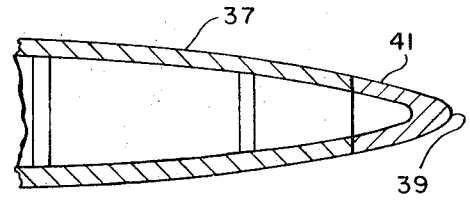
FIG. 4 is a fragmentary cross-sectional view of a wing of the reentry vehicle and taken along the line 4—4 as indicated in FIG. 3.

In FIGS. 3, 4 and 5, there is illustrated another example of prestressing opposite surfaces in the opposite sign of those arising from the temperature gradient during operation. In FIG. 3, there is shown a reentry vehicle 35 having aerodynamic wing members 36 and 37. During reentry, the leading edges, as 38 and 39, become extremely hot, having temperatures in the range of 3,000° F. to 5,000° F. The configuration of the wing 37 in cross-sectional end view is generally indicated in FIG. 4 where an insert 41 of a refractory material forms the leading edge 39. In FIG. 5, the insert is shown in an enlarged view.

During reentry operation, high tensile stresses are applied to an opposite inner surface 42 in relation to the leading edge surface 39 upon which compressive stresses are applied. A typical reentry temperature is of the order of 4,500° F. on the leading edge 39 and the temperature on the surface 42 would be considerably lower, such as 1,000° F., with a resulting high tensile stress adjacent the inner surface 42 which would tend to cause a thermal shock failure resulting from the large temperature gradient which would develop in about 5 seconds.

To prevent such thermal shock failure, compressive stresses are induced at the surface 42 and tensile stresses are induced at the leading edge 39 in accordance with the invention. This may be accomplished by heating the area around the surface 42 with an induction heater or an electron beam heater to about 2,500° F. for about 10 hours. During the heating, the leading edge 39 is kept cool by the application of a water-cooled jig, adapted to fit over a substantial part of the exterior of the insert. During the heating period substantial forces are applied in the direction of the arrows 43 and 44 to move the walls 47 and 48 apart, the forces being approximately of the order of 1,000 pounds per foot of length. Such forces deform the refractory material adjacent the surface 42 where compressive stresses are permanently induced while tensile stresses are induced at the leading edge 39. The forces could be applied with a hydraulic jack, for example, and after the required period, the heat and force applying means are removed and the insert is permitted to cool to room temperature, the induced stresses remaining.

Figure 6:
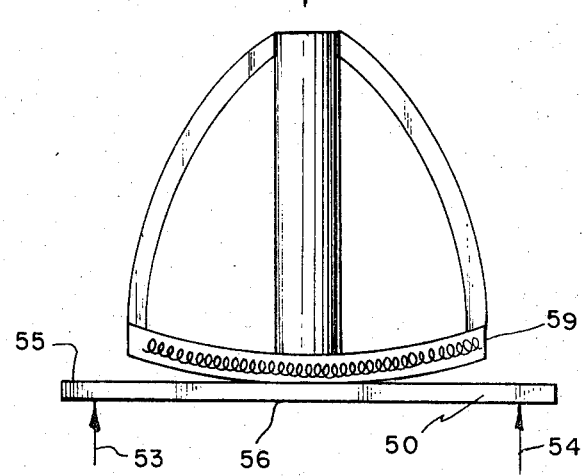
FIG. 6 is a diagrammatic view illustrating the application of the invention on a flat plate of refractory material.

In FIG. 6, there is shown a flat plate 50 of a refractory material, such as a tungsten-rhenium alloy, supported at arrows 53 and 54. Compressive stresses are induced in the upper surface 55 in the area thereof desired and at the same time tensile stresses are induced in the lower side 56 in accordance with the invention. Shown schematically in an induction heater 59 which, with a force, is applied in the direction of the arrow 60, the heating and force being applied for a period of about 48 hours and at a tempertaure of 2,500° F.; while at the same time, the lower side 56 is cooled by a water-cooled member positioned against the underside 56. The induced residual stresses adapt the plate to withstand a large temperature gradient if compressive stresses and heat are applied to the side 55 at the surface where the tensile residual stresses were induced or if tensile stresses are applied to the lower side 56 where the residual compressive stresses were induced.

The invention and its attendant advantages will be understood from the foregoing description, and it will be apparent that various changes may be made in the form, construction and arrangement of the parts of the invention without departing from the spirit and scope thereof or sacrificing its material advantages, the arrangement hereinbefore described being merely by way of example. I do not wish to be restricted to the specific forms shown or uses mentioned, except as defined by the accompanying claims, wherein various portions have been separated for clarity of reading and not for emphasis.

I claim:
1. A method of prestressing an article made of a refractory material, comprising:
   (a) heating a surface of the article until it is hot enough to flow plastically, the heating being slow enough to avoid thermal shock;
   (b) applying a pressure to the article to cause the heated surface material to flow plastically and be deformed; and
   (c) cooling said surface and providing residual stresses in said surface and opposite residual stresses in a surface opposite said heated surface.
2. The method according to claim 1 including:
   removing said pressure after the heated surface has been permanently deformed.
3. The method according to claim 1 in which the pressure is applied by a strength member and including the step of:
   cooling said strength member while it is being applied to the article.
4. The method according to claim 3 including the step of:
   cooling said opposite surface while said heated surface is being heated to establish a temperature gradient.
5. The method according to claim 1 in which:
   (a) the article is a ring and the heated surface is its outer circumferential surface;
   (b) the pressure being applied on the inner circumferential surface of the ring, radially outwardly to cause the plastic deformation to occur in the outer circumferential surface,
   (c) whereby the residual stresses of the outer circumference are compressive and the residual stresses at the inner circumference are tensile.
6. The method according to claim 5 in which the pressure is applied by:
   (a) snugly fitting a mating ring on said inner circumference;
   (b) said mating ring having a conical-shaped central opening;
   (c) fitting a rod having a mating conical surface into said central opening;
   (d) supporting said rings against axial movement; and
   (e) forcing said rod axially in said mating conical surface to produce radially outward forces in said mating ring and said article ring to cause said deformation in said outer surface.
7. The method according to claim 5 including the steps of:
   cooling said rod and said mating ring by circulating a cool liquid therein.
8. The method according to claim 1 in which:
   (a) the article is generally angular having a generally closed leading edge and is hollow, having an open rear end;
   (b) said article being formed of a wall with similar corresponding inner and outer generally parallel surfaces;
   (c) the heated surface being the inner surface adjacent the closed end;
   (d) the pressure being applied radially outwardy to the wall adjacent the open end to cause the plastic deformation to occur in the wall at the inner surface of the closed end; and
   (e) whereby the residual stresses at the inner surface are compressive and the residual stresses at the inner circumference are tensile.
9. The method according to claim 8 including the step of:
   cooling said outer surface at said leading edge.
10. The method according to claim 1 in which:
    (a) the article is a flat plate;
    (b) the heated surface is on one side of said plate; and
    (c) the pressure being applied to said heated surface to plastically deform said plate, while the plate is supported against other movement.
11. A prestressed article of manufacture made of refractory material, comprising:
    (a) a surface of said article which has been plastically deformed by applied pressure after being heated to be ductile;
    (b) a surface opposite to said first surface; and
    (c) one of said surfaces having a compressive residual stress and the other of said surfaces having a tensile residual stress.

References Cited
UNITED STATES PATENTS 2,682,936    7/1954    Almen _____ 148—131

LOWELL A. LARSON, Primary Examiner

U.S. Cl. X.R.
29—447; 148—131